Patented Sept. 9, 1941

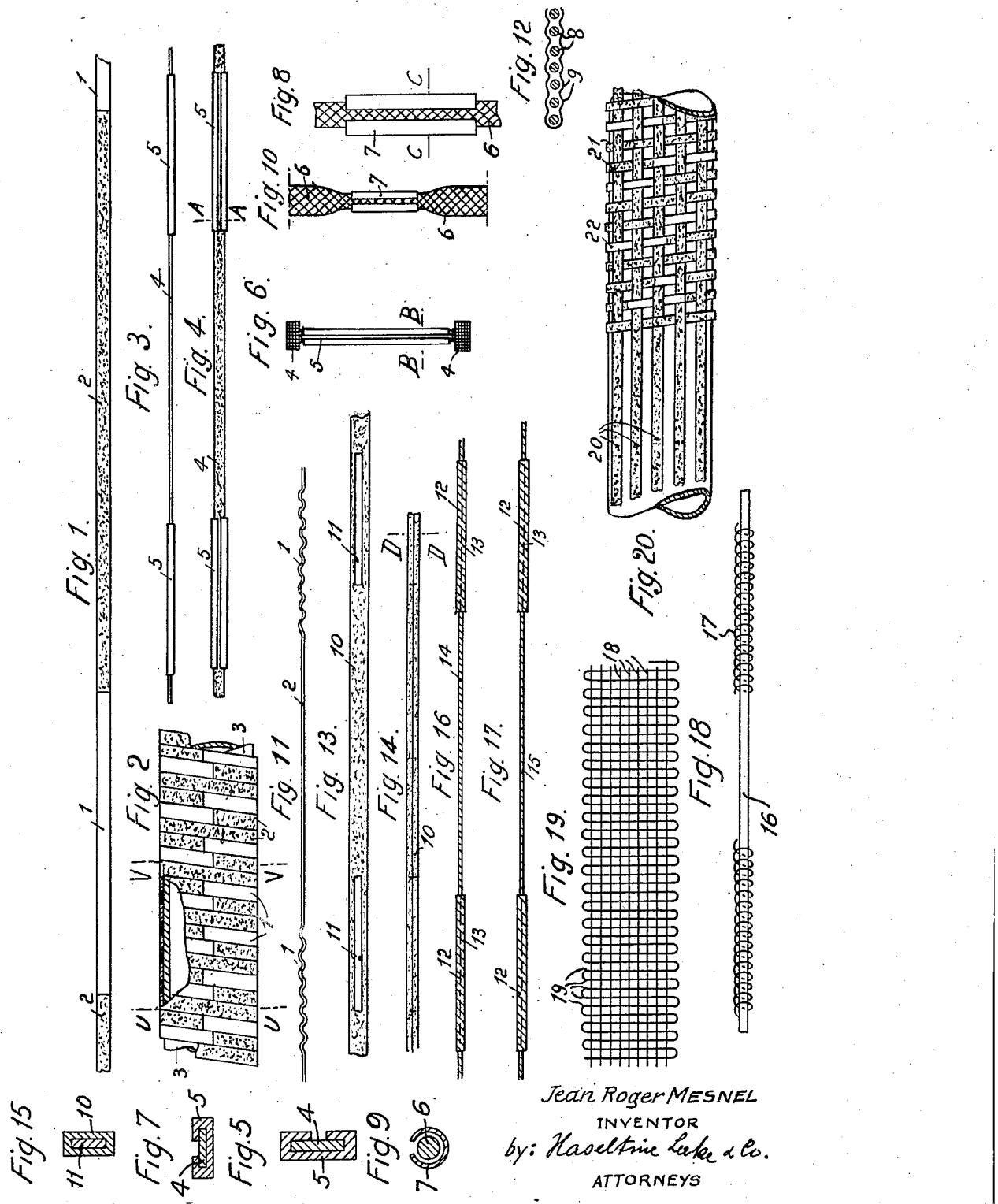

2,255,391

UNITED STATES PATENT OFFICE 2,255,391

REINFORCED FLEXIBLE PIPE

Jean Roger Mesnel, Colombes, France, assignor to Société Mesnel Frères, Colombes, Seine, France Application August 18, 1937, Serial No. 159,638
In France August 24, 1936

4 Claims. (Cl. 138—56)

This invention relates to a reinforced flexible pipe, particularly a pipe or hose made of rubber or the like, and wherein the reinforcement comprises a continuous succession of rigid portions, for instance metallic portions, alternating with and connected to flexible portions, for instance of textile nature, which according to the invention are advantageously connected to each other in a special manner.

The metallic portions impart rigidity to the mutually adjacent zones of the pipe. The flexible portions allow the mutually adjacent zones or portions of the pipe their natural flexibility. Due to the inter-connection of the rigid and the flexible portions, a reinforcing material of heterogeneous nature is obtained which, when arranged about a pipe, produces a pipe having alternately flexible and rigid zones. The reinforcing material being formed as a continuous band or strip it will be readily seen that a reinforced flexible pipe of any length whatever, can be produced at a relatively small cost.

Such a pipe is particularly suitable for forming connections between rigid pipes as the zones adjacent the flexible portions of the reinforcement can be used for securing the connection of the ends of the pipes intended to be connected and the presence, in these zones, of portions of a textile nature in the reinforcement does not hinder in any way the clamping of the ends of the connection around the ends of the pipes thus to be connected, in order to obtain a fluid-tight connection; so that the zones adjacent the metallic portions will impart to the connection the rigidity necessary for allowing it to be curved according to various contours without risk of flattening.

The connecting portions can be cut off as needed from a pipe made according to the invention. This severing, if it is effected adjacent the flexible portions of the reinforcement, prevents any metallic part from protruding from the face of the cut off portion.

In the accompanying drawing:

Fig. 1 is a symbolic view of a reinforcement used.

Fig. 2 is a diagrammatic view with partial section of a reinforced pipe made according to the invention.

Fig. 3 shows in elevation a reinforcement comprising a flexible band having metal plates clamped thereon.

Fig. 4 is a corresponding plan view.

Fig. 5 is a cross section on line A—A of Fig. 4.

Fig. 6 shows a modification, in plan view.

Fig. 7 is a corresponding cross section on line B—B of Figure 6.

Fig. 8 shows another modification in plan view.

Fig. 9 is a corresponding cross section on line C—C of Figure 8.

Fig. 10 is a plan view of another modification.

Fig. 11 shows in elevation still another modification.

Fig. 12 shows in cross section another modification.

Figs. 13 to 15 relate to another modification.

Fig. 13 shows in plan view, the reinforcement in a first phase of manufacture.

Fig. 14 shows this reinforcement terminated.

Fig. 15 is a cross section made according to D—D of Fig. 14.

Fig. 16 shows a reinforcement in an embodiment obtained by plaiting.

Fig. 17 shows a reinforcement in an embodiment obtained by lapping.

Fig. 18 illustrates a modification.

Fig. 19 shows a reinforcement in the form of a braid.

Fig. 20 shows, in elevation, a portion of pipe in which the reinforcement is constituted by circular weaving.

In Fig. 1 will be seen, symbolically illustrated, a reinforcement according to the invention constituted by a continuous succession of rigid portions 1, which may preferably be metallic portions, and flexible portions 2, made preferably of a textile material.

By winding this reinforcement around a flexible or semi-rigid pipe 3, a reinforced pipe is obtained presenting in alternating succession rigid zones—those immediately adjacent the metallic portions of the reinforcement—and zones in which the flexibility of the pipe has not been modified by winding—those adjacent the flexible portions.

In the embodiment illustrated in Fig. 2, it will be seen that the length of the metallic portions 1 and the value of the pitch of the winding have been so chosen that each of the metallic portions will be slightly longer than the circumference of the pipe it covers.

It is to be understood that such a reinforced pipe can, moreover, be covered in any manner whatever, but with a flexible material.

If this pipe is cut according to the planes U—U, V—V passing through flexible zones of the reinforcement, it will be seen that both ends of the severed portions are formed of flexible material, having no metallic asperities.

According to the modifications shown in Figs. 3 to 5, the reinforcement can be constituted by a preferably flexible band 4, on which are clamped, at intervals, small metal plates 5. The winding of this armature about a pipe makes it possible to obtain a reinforced pipe presenting the characteristic features of the invention.

In the modification illustrated in Figs. 6 and 7, the width of the portions 2, of a purely textile nature, is greater than that of the rigid portions 1. The relative lengths of the flexible and rigid zones of the pipe can thus be easily adjusted.

The modification shown in Figs. 8 and 9 is similar to the embodiment shown in Figs. 3 to 5; with the exception that the flat textile core in the form of a ribbon is herein replaced by a tubular core 6 on which are clamped small tubular plates 7.

Fig. 10 shows a modification of the preceding one in which the width of the flexible portions is greater than the width of the rigid portions.

In the embodiment shown in Fig. 11, the rigid portions 1 are corrugated.

In the reinforcement shown in Fig. 12, the core is constituted by a series of parallel strings or cords 8; on these strings are set, at intervals, clamping irons 9, for forming the rigid portions.

The reinforcement illustrated in Figs. 13 to 15 is obtained in the following manner: A flexible ribbon 10 is rendered adhesive on one of its faces, the ribbon being preferably made of a rubber and covered with rubber solution. Small metal plates 11 are placed at regularly spaced intervals, on the adhesive face of the ribbon. The edges of the latter are folded down as shown in the drawing. A continuous reinforcement is thus obtained, successively presenting rigid portions 1 and flexible portions 2, and the external aspect of which is that of a homogeneous ribbon, no metallic portion being visible.

In the form shown in Fig. 16, the reinforcement comprises a succession of filiform metal elements 12 spaced from each other; around these elements a braiding or plaiting is effected with a thread of textile nature 13. This plaiting is continued between the metal elements so as to form a braided or plaited portion 14, exclusively of textile material.

In the reinforcement shown in Fig. 17, the metal elements 12 have been connected, not by plaiting a thread of textile material, but by lapping or covering, that is to say by winding in a spiral. The portion 15 is constituted by the sole lapping or covering of textile material.

In Fig. 18, the reinforcement is constituted by a flexible thread 16, preferably of textile material, upon which is wound, at certain intervals, a very thin wire 17. After having been wound on a pipe, the wire portions 17 are rendered rigid, by any suitable means (electrolysis, metallization, tinning, etc.).

In Fig. 19, the reinforcement is constituted by a braid made on a bar-loom, the warps 18 being of textile material and the wefts 19 partly textile and partly metallic, these last portions are illustrated in heavier lines.

In Fig. 20 is shown diagrammatically, a reinforced pipe made according to the invention obtained by circular weaving; the warps 20 extend in the longitudinal direction of the pipe and are exclusively of textile nature; the circular shuttle is filled with a heterogeneous thread so as to constitute a spiral winding, partly textile 21, partly metallic 22.

In most of the preceding figures, the dimensions in width of the reinforcement have been amplified relatively to reality, for greater clearness.

A modification (not shown) is also possible in which the metal elements above mentioned are replaced by elements (threads, lamellae or other profiled members) made of rubber of such a composition that upon vulcanization, their hardness becomes sufficient for imparting to the zones of the reinforcement they concern, the desired rigidity.

The flexible elements uniting or connecting these rigid elements can be of either textile or rubber material; in this latter case, an "all rubber" reinforced pipe is obtained.

What I claim as my invention and desire to secure by Letters Patent is:

1. Reinforced hose comprising a core of flexible material and a reinforcement consisting of a winding of abutting turns of a band formed of a continuous succession of flexible parts and rigid parts, the length of each flexible portion being at least equal to that of one complete turn of the winding.

2. Hose according to claim 1, in which the reinforcement consists of a flexible band forming a sheath and a plurality of rigid platelets enclosed in said band in spaced arrangement.

3. Hose according to claim 1, in which the reinforcement consists of a flexible band having the turns thereof embracing rigid filiform members at spaced positions.

4. Hose according to claim 1, in which the reinforcement consists of a flexible band on which rigid filiform members are wound at spaced positions.

JEAN ROGER MESNEL.